US006108436A

United States Patent [19]
Jansen et al.

[11] Patent Number: 6,108,436
[45] Date of Patent: Aug. 22, 2000

[54] SYSTEM FOR CONTROLLING REGISTRATION OF A WEB AND METHOD OF USE THEREOF

[75] Inventors: Menno Jansen, Lisse; Erik Andreas Van Holten, Geertuidenberg, both of Netherlands

[73] Assignee: Q.I. Press Controls V.O.F., Oosterhout, Netherlands

[21] Appl. No.: 08/982,675

[22] Filed: Dec. 2, 1997

[30] Foreign Application Priority Data

Dec. 2, 1996 [NL] Netherlands .......................... 1004663

[51] Int. Cl.[7] ...................................................... G06K 9/00

[52] U.S. Cl. .......................... 382/112; 382/287; 101/486

[58] Field of Search .................................... 382/100, 112, 382/162, 165, 287, 294; 348/88, 94, 95; 356/429; 250/548, 559.01, 559.07, 559.08, 559.29, 559.3; 101/485, 486

[56] References Cited

U.S. PATENT DOCUMENTS

| | | | |
|---|---|---|---|
| 4,528,630 | 7/1985 | Sargent | 364/469 |
| 4,736,680 | 4/1988 | Wales et al. | 101/426 |
| 4,887,530 | 12/1989 | Sainio | 101/181 |
| 4,932,320 | 6/1990 | Brunetti et al. | 101/181 |
| 5,018,213 | 5/1991 | Sikes | 382/8 |
| 5,115,141 | 5/1992 | Gold | 250/548 |
| 5,138,667 | 8/1992 | Roch et al. | 382/1 |
| 5,305,099 | 4/1994 | Morcos | 348/88 |
| 5,329,466 | 7/1994 | Monney | 364/559 |
| 5,764,367 | 6/1998 | Schaede et al. | 356/429 |
| 5,813,333 | 9/1998 | Ohno | 101/181 |

FOREIGN PATENT DOCUMENTS

| | | | |
|---|---|---|---|
| 3809941 | 10/1988 | Germany | B41F 13/14 |

*Primary Examiner*—Andrew W. Johns
*Attorney, Agent, or Firm*—Webb Ziesenheim Logsdon Orkin & Hanson, P.C.

[57] ABSTRACT

The invention relates to a method for monitoring the quality of a moving web of multicolor print during a printing process, including monitoring the mutual location of the various colors on the basis of marks arranged on the web of print and further monitoring the location in longitudinal direction and transversal direction of the web of print in relation to at least one printing press.

18 Claims, 5 Drawing Sheets

SYSTEM FOR CONTROLLING REGISTRATION OF A WEB AND METHOD OF USE THEREOF

BACKGROUND OF THE INVENTION

The invention relates to a method for monitoring the quality of a moving web of multicolor print during a printing process, comprising monitoring the mutual location of tho various colors on the basis of marks arranged on the web of print and further monitoring the location in longitudinal direction and transversal direction of the web of print in relation to at least one printing press. Such a method is known, for instance from the U.S. Pat. No. 5,018,213.

During a printing process it is of great importance that the quality of the print is continuously monitored as printing is a dynamic process, wherein over time deviations of the various set parameters may occur. For instance the properties of the web of material to be printed, in general paper may vary with the temperature and humidity in the room where the printing process is performed whereas these properties may further differ from one roll to another. Furthermore, the settings of the printing press may also shift, while variations in the supply of printing ink may also lead to variations.

In particular, in multicolor printing continuous monitoring is of great importance since such printing is performed in a plurality of subsequent printing steps in which one color is printed each time. It is then, of course, very important that the colors are printed on the web in the correct mutual relationship during subsequent printing steps since the formation of mixed colors depends on dots of the correct colors being printed in precisely determined ratios at precisely determined locations. Not only the location of the dots of the various colors in relation to each other is of importance, but also the location of a printed text or image in relation to the edges of the web. When this location is not correctly chosen, there is a risk that parts of the text or image may be lost during subsequent cutting of the print.

In the past monitoring of print was generally performed manually. To this end a completed example of the print was regularly checked, and on the basis of errors determined therein the required adjustments to the various settings were performed. This monitoring was time consuming. Moreover, the time which elapsed between an error being detected and the same being corrected was such that a relatively large quantity of print of low quality was made, therefore a large loss of production could occur. Thus, there exists a need for an apparatus and method for monitoring the printing process.

In the above-mentioned U.S. Pat. No. 5,018,213 a method is described in which by means of a digital camera an image is recorded of marks in various colors which are printed in a fixed and predetermined pattern on the web next to the actual print. From the images thus recorded the mutual location of the marks in the various colors is determined, after which in case of possible deviations from the required location an error signal is generated. This error signal may be used for performing the necessary adjustments. For recording the images the print is periodically illuminated by means of a stroboscope, whereby the print is "frozen" as it were in relation to the camera. This method has the drawback that the CCD chip functions in interlaced mode and so called "smearing" may occur in the image when the images move fast, so that the measurement may be inaccurate. The camera that is used has a fixed focal distance, so that the web of paper has to be guided such that it passes the camera at the right distance. To that end use is made of guide rolls, so that the ink has to be sufficiently dry when passing the camera. The camera is therefore arranged downstream of a drying street, which result in a long control loop.

No mention is made in this document of monitoring the location of the printed text or images in relation to the edges of the printed paper web. From other publications however, it is already known to measure the location of a web of paper in relation to the printing press by means of for instance two separate photoelectric sensors, one for detecting the position of the edge of web of paper and another one for detecting a separation mark between two subsequent images of the print.

SUMMARY OF THE INVENTION

The invention now seeks to provide an improved method of the type described above. According to the invention this is accomplished in that the location of the web of print in relation to the printing press is determined by determining the location of the marks in relation to the printing press. By combining monitoring of the mutual location of the colors and that of the absolute location of the printed images a single observation will suffice. This has the advantage that the mutual adjustment of the observations is simpler and the risk of errors is reduced. Furthermore the necessary equipment for performing the monitoring observations may be smaller and simpler, and may therefore be manufactured for lower cost. Furthermore the single observation may in principle be performed at any suitable moment during the printing process, albeit in any case after the last printing step.

The invention also relates to a device for performing the method described above. From the above-mentioned U.S. Pat. No. 5,018,213 a device is known comprising means for monitoring the mutual location of the various colors on the basis of marks arranged on the web of print, and means for monitoring the location in longitudinal and transversal direction of the web of print in relation to at least one printing press. In accordance with the invention such a device is characterized by the fact that the location monitoring means are integrated in the color monitoring means.

BRIEF DESCRIPTION OF THE DRAWINGS

The invention will now be illustrated by means of an example, with reference being made to the annexed drawing, in which.

DESCRIPTION OF THE PREFERRED EMBODIMENTS

Figure 1:
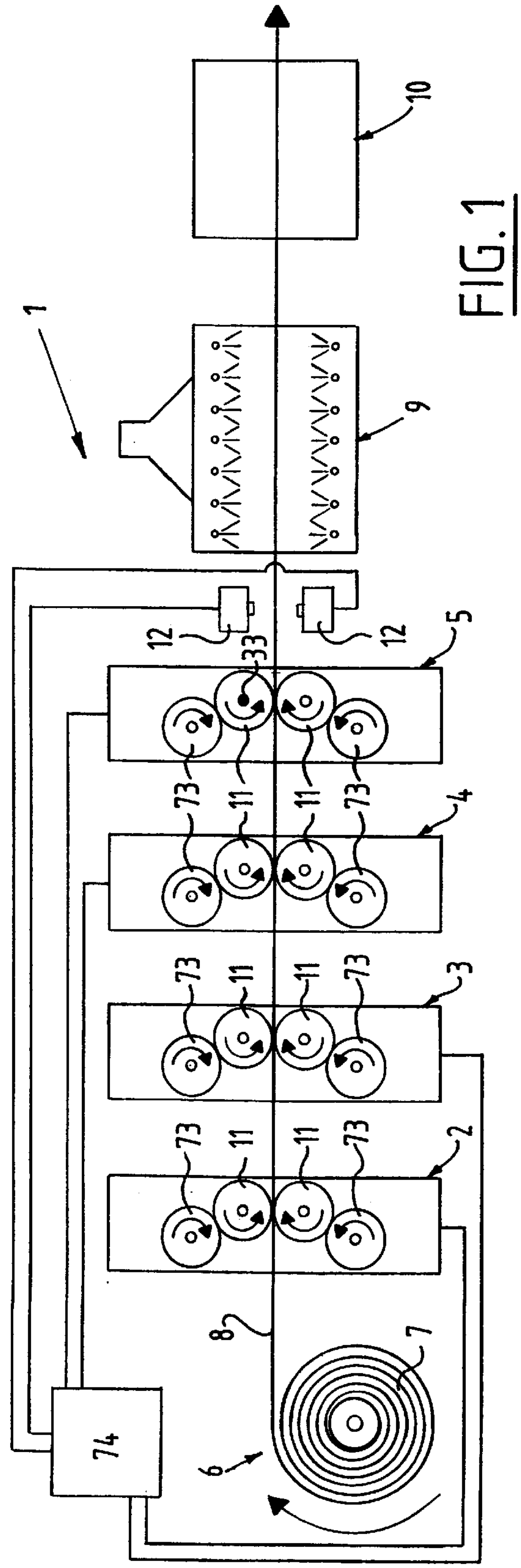
FIG. 1 is a schematic side elevation of a printing street comprising a monitoring device in accordance with the invention.

In a printing street 1 (FIG. 1) a web 8 of a suitable material, in general paper is subjected to a multicolor printing process. To this end the printing street 1 comprises four printing presses 2, 3, 4, 5, in which black, red, blue and yellow ink respectively is printed on the web 8; in the illustrated example by means of an offset rotary technique. The printing presses 2, 3, 4, 5 are double acting, and comprises a blanket cylinder 11 and a plate cylinder 73 both above and under the paper web 8, so that the web 8 is printed on both sides. The printing street 1 further comprises a supply station 6, where a roll of paper 7 is wound off, a drying street 9 arranged downstream of the last printing press 5, in which the ink is dried by evaporating the solvents present therein, and a folding and cutting station 10 where the printed web 8 is cut into broadsheets which are folded once or several times into for instance pages of a magazine or book. The broadsheets that are folded are subsequently cut along their edges.

In such a multicolor printing process it is of paramount importance that the various colors are printed on the paper web 8 in the correct mutual relationship, in order to obtain a sharp image in the correct colors, in particular mixed colors. Furthermore it is very important that the print is arranged at the correct location on the web 8, in order to prevent parts of the print from being lost during folding and cutting. To this end the printing street 1 comprises monitoring devices 12 on both sides of the paper web 8. In the illustrated example the monitoring devices 12 are arranged directly downstream of the last printing press 5, but it is also conceivable that these are arranged for instance downstream of the drying street 9 of even at the location of the folding and cutting station 10. The quality monitoring device 12 comprises means for monitoring the mutual location of the various colors on the basis of marks 21–26, printed on the web of print 8, and means integrated therewith for monitoring the location of the web of print in longitudinal and transversal direction in relation to the printing presses 2, 3, 4 and 5. These location monitoring means are thus arranged for determining the location of the print on the basis of the marks 21–26 with which also the mutual relation of the colors is monitored.

Figure 2:
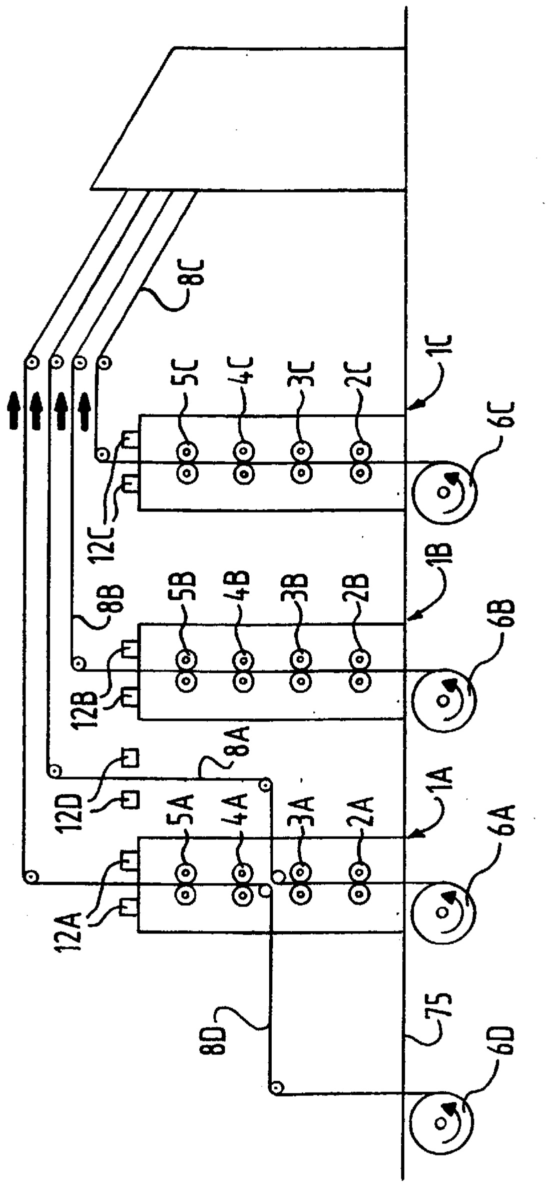
FIG. 2 is a schematic side elevation of an alternative embodiment of the printing street comprising a plurality of printing presses arranged over each other.
Figure 5A:
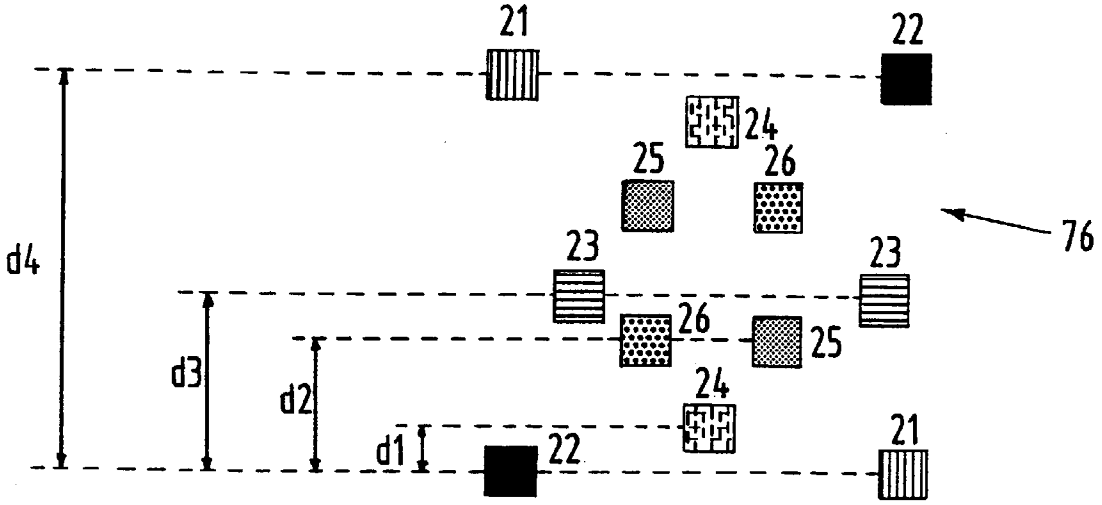
FIG. 5A is a schematic top view of a plurality of marks arranged on the print.

The marks 21–26 are arranged on the print in pairs in a predetermined pattern 76 of about 8 by 5 mm (FIG. 5A), such that they are by no means printed on the actual images. Each pair of marks 21–26 is in one of that colors of the print. In the illustrated example the marks 21 are red, the marks 22 are black, the marks 23 are blue and the marks 24 are yellow. Furthermore locations are reserved in the pattern for additional marks 25, 26 when more than four colors have to be printed. These additional marks 25 and 26 are printed in the so-called "support colors". When a certain color is not printed, for instance in the case of the paper web 8A or 8D in FIG. 2, the associated pair of marks is not printed either. This is automatically ignored by the monitoring device 12.

Figure 5B:
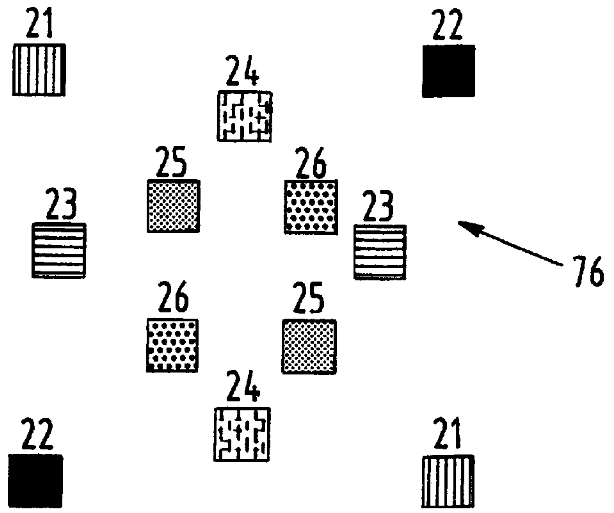
FIG. 5B is a view corresponding with FIG. 5A of the marks illustrating a somewhat shifted location thereof.

The marks 22–26 are printed with a fixed mutual distance d1, d2, d3 and d4 in relation to a reference mark, e.g., red mark 21. When the color red is not present in the print, the location monitoring means are arranged for selecting a different color of mark, e.g., black mark 22, as the reference mark. When the print does not include black ink either, another color of mark, e.g., blue mark 23, is selected as the reference mark. When the print does not include blue ink either, yet another color mark, e.g., yellow mark 24, is selected as the reference mark. When no valid reference mark is detected, an error signal is generated and a search is performed until a mark that may be used as reference is again found. The mutual distances between the marks 21–26 are equal in both the longitudinal direction L and the transversal direction T of the web 8, and in the illustrated example are d1=0,2 mm, d2=0,4 mm, d3=0,9 mm and d4=1,8 mm. The dimensions of the marks 21–26 are 0,2×0,2 mm. The mutual location of the colors may be monitored in a manner known per se by measuring the distances d1, d2, d3 and d4 in both directions and comparing these with stored values for these distances. When deviations are detected (FIG. 5B) an error signal may be generated, which may be supplied to a press control system 74 whereby the corresponding printing press 2, 3, 4, or 5 may be adjusted.

It is further important that rectangular or square marks 21–26 are used, so that not only the mutual location of the colors may be determined, but also the position of the print. Deviations in the position of the print are made visible in that one of the diagonals of the rectangle or square is lengthened and the other one is shortened. Furthermore, it may thus be established if in fact a valid mark is read, rather than a spatter of ink or some dirt.

In accordance with the present invention the marks 21–26 for monitoring the mutual location of the colors are also used for determining the location of the web 8 in relation to the printing presses 2, 3, 4, 5, and thus the location of the print on the web 8 in relation to the edges of the web 8 and the future cutting lines along which the web 8 is to be cut into sheets. To that end the location of the reference mark 21 in a recorded image 31 of the marks is measured, and furthermore the location of the recorded image in longitudinal and transversal direction L, T of the web 8 is determined.

Figure 4:
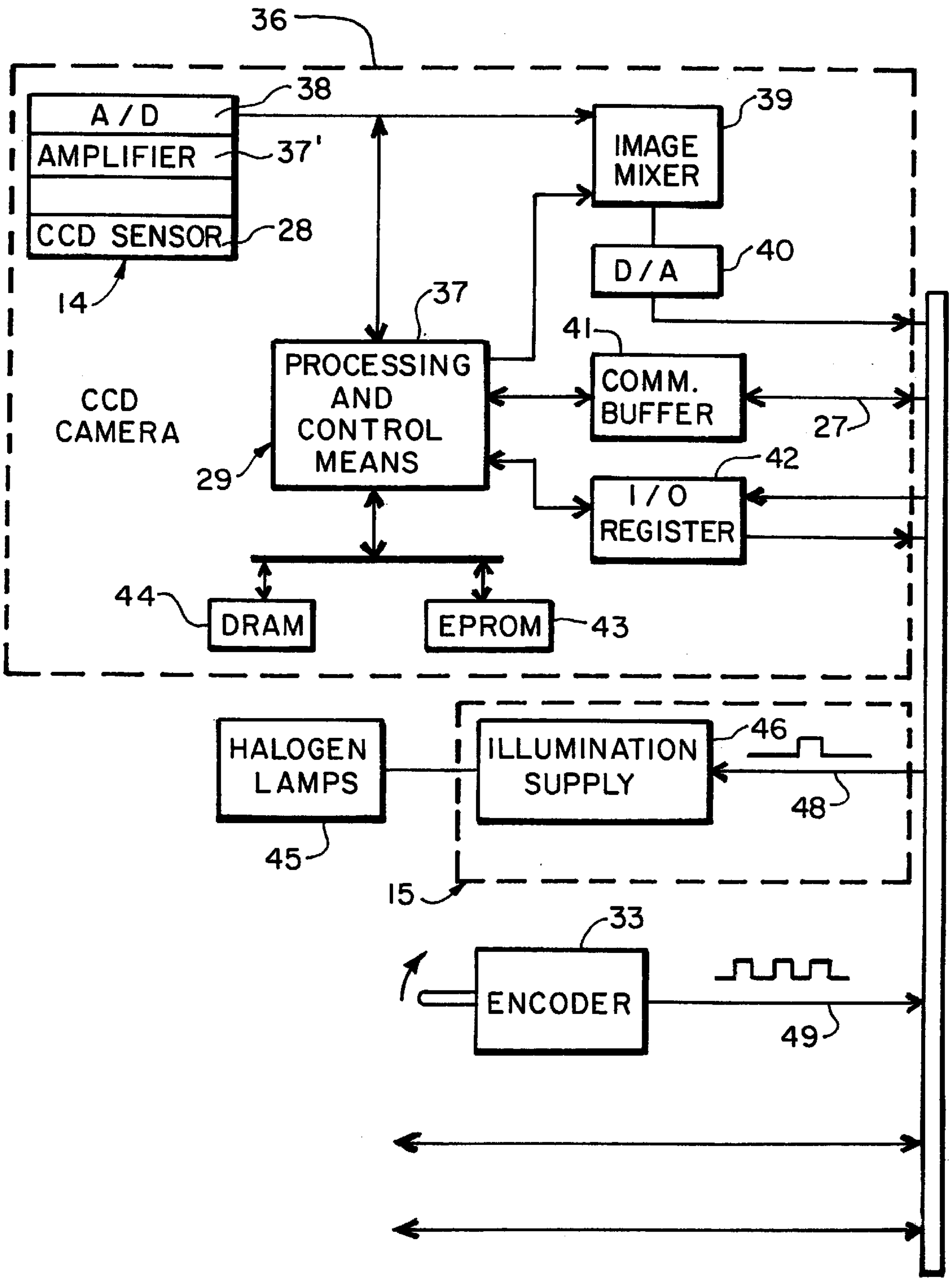
FIG. 4 is a block diagram of the various components of the image recording means and the processing and control means connected therewith.

The means for monitoring the location of the colors and the position of the print therefore comprise image recording means 14 that are fixedly connected to the printing street 1, and programmable processing and control means 29 connected to the image recording means 14. The image recording means 14 are constituted by a digital or CCD camera 36, while the processing and control means 29 forms part of a signal processing circuit 37 integrated in the camera 36 (FIG. 4). The processing and control means 29 are connected by means of a communication port 27 with for instance a control device of the printing street 1. The image recording means 14 comprise a CCD sensor 28 having for instance 752×582 pixels, an amplifier 37' connected therewith and an A/D converter 38. The signal processor 37, in which the monitoring of the print is performed, may be for instance a 32 MHz processor of the type ADSP2181. The camera 36 further comprises the usual image mixing unit 39, and a D/A converter 40 by which the recorded image may be made visible in the form of a video image, a communication buffer 41, I/O register 42 and two memories, a read only memory EPROM 43 and a dynamic RAM 44.

In order to allow an image to be recorded of the fast moving web of paper 8 the camera 36 is further provided with a very fast shutter speed of 1/200,000th of a second. With such high shutter speeds it is important that the illumination is as strong as possible, also to eliminate influences from outside light. This technique is referred to as 'Progressive Scan' and has the advantage that all pixels are scanned without interlacing. This results in a high resolution in longitudinal direction which prevents 'smearing'. The camera is connected with an illumination supply unit 15 which supplies a voltage to the halogen lamps. The supply unit 46 is switched on by the processing and control means 29 though the I/O port 42. As soon as the printing presses start to rotate the signal 48 assumes the value 'high', and the halogen lamps are switched on.

It is of course important that an image is recorded only when marks 21–26 are present in the viewing area 20 of the image recording means 14. This viewing area may have dimensions in the order of 18 by 24 mm. The presence of marks 21–26 within the viewing area 20 may in principle be predicted, since the printing press has a constantly repeating frequency or cutting length. The location of the print in relation to the printing presses 2, 3, 4, 5 is therein measured by means of a pulse sensor or encoder 33 which indicates the angular position of one or more of the printing presses. In the illustrated example the encoder 33 is arranged on the shaft of one of the blanket cylinders 11 of the printing press 5, and therefore rotates at the same speed as the cylinder 11. The encoder 33 therein is provided with two disks rotated over 90° C. in relation to each other, each of which has 2500 marks. The passing of these marks is detected by the encoder 33 and transformed into a pulse signal 49 which is supplied to the processing and control means 29. Since the marker disks are shifted over 90° C., 5000 marks are detected for each revolution of the shaft of the cylinder 11. Since each detection furthermore results in a pulse having a rising and a falling flank, which are separated by a pulse width, 10000 measuring points per revolution are available, so that a very accurate control is possible. The encoder 33 further comprises a third disk having a single mark delivering a marker pulse or TDC (Top Dead Center) pulse, which indicates the start of a new copy. On the basis of the pulse signal 49 and the desired location of the marks 21–26 stored in the processing and control means, it may be predicted at what moment the set of marks 21–26 will be in the detection area 20 of the image recording means 14.

By controlling the image recording means 14 by means of the pulses 49 it is ensured that an image of the web 8 carrying the print always contains a set of marks 21–26 present in the field of view 20 of the image recording means 14. The image is therein 'frozen' by the high electronic shutter speed of the image recording means 14.

Figure 7:
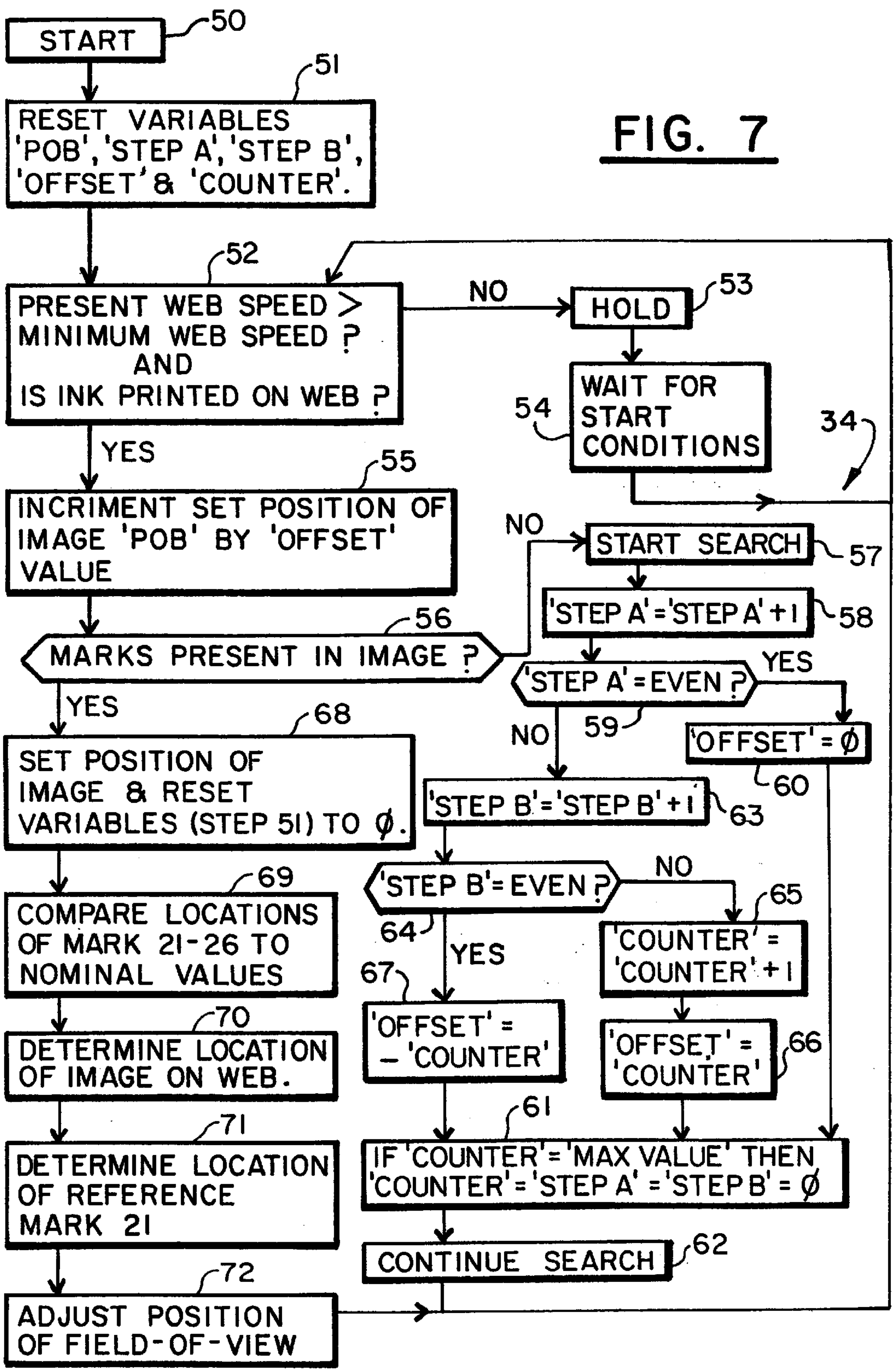
FIG. 7 is a flow diagram of a search programme for marks forming part of the method in accordance with the invention.

In the unlikely event that no marks 21–26 would be present in the field of the view 20, a search programme 34 is carried out (FIG. 7). This programme is initialised in block 50 after which a number of variables is reset to zero in block 51, among which the variable "POB" (location image recording), "offset", "step A", "step B" and "counter". Then in block 52 a check is made to see if two conditions are met, namely that the speed of the web is greater than the minimum speed and that the ink is being printed on the web 8, in other words if the printing street is active. When these conditions are not met the programme jumps to a hold routine in block 53 and the user is informed in block 54 that the system is waiting for the start conditions.

When the start conditions are met a set location for the position of the image POB to be recorded is incremented in block 55 by the offset value. Then a check is made in block 56 to see if marks are present in the image recorded at that position. If this is not the case a search routine for marks is started in block 57. Therein the variable "step A" is incremented by 1 in block 58, after which a check is made in block 59 whether "step A" is even. If this is the case the variable "offset" is reset to zero in block 60, and the programme jumps to block 61. There it is checked if the "counter" equals the maximum value, and if this is the case the "counter" is reset to zero, "step A" is reset to zero and "step B" is reset to zero. Subsequently it is indicated in block 62 that the search routine is continued.

The programme then returns to block 52 where again a check is made to see if the start conditions are still met. When in block 59 it is determined that "step A" is odd, the variable "step B" is incremented by 1 in block 63 and in block 64 a check is made whether this value of this variable is even. When this is not the case the variable "counter" is incremented by 1 in block 65, and the "offset" is set equal to the "counter" in block 66, after which the programme jumps to block 61. When the variable "stop B" is even the value of the "offset" is set at the opposite of the "counter" in block 67. As long as it is determined in block 56 that no marks are present, the programme runs through the blocks 57 to 67. Therein steps are in fact made around a predetermined fixed point in accordance with the series 0, 1, 0, –1, 0, 2, 0, –2, 0, 3, 0, –3, . . . The return to 0 is important therein, as a color may temporarily disappear from the print, for instance because the ink has run out, and may reappear after a short while. In that case the search programme should be prevented from meanwhile searching a completely different part of the print for the presence of the marks. When finally in block 56 it is determined that marks are indeed present, in block 68 the new position of the image is set at the original position of the image incremented by the "offset" found, and all variables are reset to zero.

It should be noted that the location of the recorded image in transversal direction of the web is not changed, and a search programme is only carried out in longitudinal direction of the web, as in practice the shifting of the web in transversal direction is so limited that the marks will always pass through the field of view 20 of the image recording means 14.

After that the mutual location of the various colors and the absolute location of the print on the paper web may be determined on the basis of the detected marks 21–26. To this end the locations of the marks 21–26 in relation to each other in longitudinal and transversal direction are measured and compared to the nominal values stored in the processing and control means 29 in block 69. Then in block 70 the coordinates of one of the marks within the recorded image 31 are measured, which in combination with the location of the recorded image 31 determined in block 68 determine the location of the image on the paper web 8. For determining the location of the reference mark 21 in the recorded image 31 in terms of x and y coordinates in relation to an origin or vertex O the grid points between the mark 21 and a vertex O of the recorded image may simply be counted. The data thus found are eventually outputted in block 71, after which the position of the field of view 20 is adjusted in block 72 such that the marks 21–26 may be expected to be centered in a next recorded image. In this way the automatic search is performed in the print for the marks 21–26, and from this both the mutual relation of the colors and the absolute location of the image on the paper web is determined.

Figure 3:
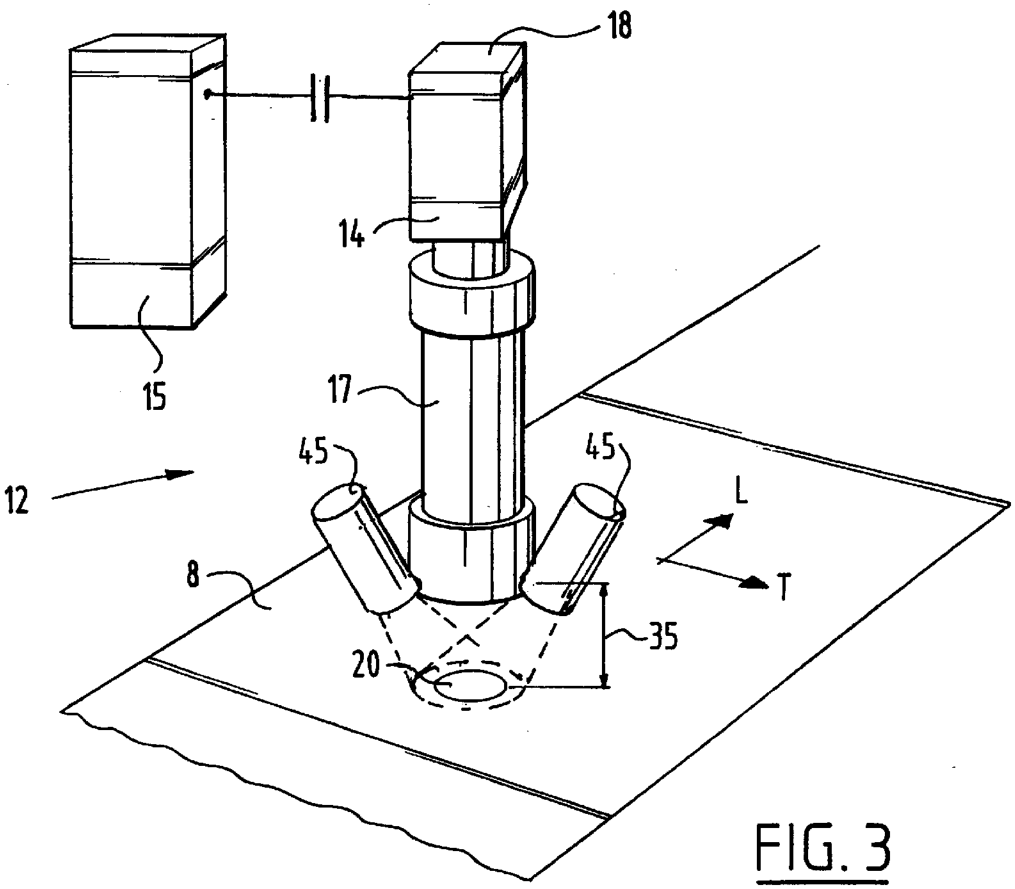
FIG. 3 is a schematic perspective view of the image recording means and the processing and control means connected therewith of the device in accordance with the invention.
Figure 6:
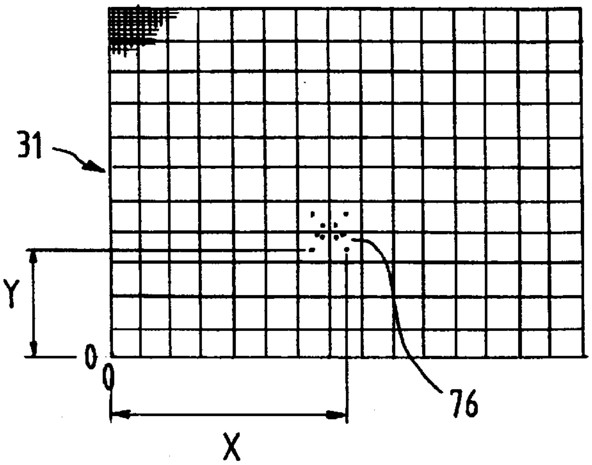
FIG. 6 is a schematic view of an imaging grid of the camera of FIG. 3.

An important feature of the device according to the invention is further that the image recording means 14 are arranged for recording sharp focus images from various distances 35 from the moving web of print 8. This is possible because the image recording means 14 comprise a lens 17 having a variable focal distance, a so-called telocentric lens (FIG. 3). With such a lens sharp focussed images may be recorded in for instance a range of ±8 mm around the nominal focal distance, so that the paper web 8 need not be supported during monitoring observations. This is an important advantage, as supporting the paper web in order to fix the focal distance has for its result that the observation can only take place at a point where the ink is sufficiently dry, therefore downstream of the drying street 9, which results in a relatively long and therefore slow control loop. Furthermore, this allows relatively complicated and costly air stabilization systems which are used in prior art printing streets when the observation must be performed immediately after the last printing press to be dispensed with.

Although the invention has been described above on the basis of a number of examples, the skilled person will appreciate that it is not so limited, and that a great many modifications are possible. For instance several control devices 12 might be arranged along the printing street, for instance one downstream of the last printing press 5 and a next one at the folding and cutting station 10, in order to allow the various steps of the printing process to be perfectly monitored. Furthermore, separate image recording means 14 could be used for monitoring the mutual relation of the colors and the absolute location of the print on the web, with the advantage in relation to known systems residing in the fact that due to tho variable focal length the monitoring may be performed without the web of paper having to be guided or supported. The scope of the invention is therefore only determined by the annexed claims.

What is claimed is:

1. A method for monitoring the quality of a moving web of multicolor print during a printing process, comprising monitoring of the mutual location of the various colors on the basis of marks arranged on the web of print and further monitoring the location in longitudinal direction and transversal direction of the web of print in relation to at least one printing press, wherein the location of the web of print in relation to the printing press is determined by determining the location of the marks in relation to the printing press.

2. The method as claimed in claim 1, wherein images of the marks on the web of print are recorded from a point that is fixed in relation to the printing press and the location of the marks in each recorded image is measured.

3. The method as claimed in claim 2, wherein the location of the recorded image in longitudinal direction of the web of print is determined by detecting an angular position of the printing press.

4. The method as claimed in claim 2, wherein each recorded image is checked for the presence of the marks, and the imaging point is shifted in longitudinal direction when no marks are detected.

5. The method as claimed in claim 4, wherein after each shifting the imaging point is returned to an initial location.

6. The method as claimed in claim 2, wherein the web of print is not supported during recording of the image.

7. The method as claimed in claim 1, wherein the marks comprise a plurality of rectangles in the colors of the print arranged in pairs in a predetermined pattern on the print.

8. The method as claimed in claim 7, wherein further the location of the rectangles is monitored.

9. A device for monitoring the quality of a moving web of multicolor print during the printing process, comprising means for monitoring the mutual location of the various colors on the basis of marks arranged on the web of print and means for monitoring the location in longitudinal and transversal direction on the web of print in relation to at least one printing press wherein the location monitoring means are integrated with the color monitoring means.

10. The device as claimed in claim 9, wherein the color monitoring means and the location monitoring means comprise image recording means fixedly connected to the printing press and programmable processing and control means connected therewith, said means being arranged for measuring the location of the marks in a recorded image.

11. The device as claimed in claim 10, wherein the processing and control means are controllably connected with a sensor for determining the angular position of the printing press.

12. The device as claimed in claim 10, wherein the processing and control means are arranged for monitoring the recorded image for the presence of marks and for performing a search programme when no marks are detected.

13. The device as claimed in claim 12, wherein the processing and control means are arranged for returning to an initial position after each step of the search programme.

14. The device as claimed in claim 10, wherein the image recording means are formed by a digital camera.

15. The device as claimed in claim 14, wherein the processing and control means are integrated in the camera.

16. The device as claimed in claim 10, wherein the image recording means are arranged for recording sharp images from various distances from the moving web of print.

17. The device as claimed in claim 16, wherein the image recording means comprise a telocentric lens.

18. The device as claimed in claim 10, wherein the image recording means comprise a progressive scan CCD.

* * * * *

UNITED STATES PATENT AND TRADEMARK OFFICE

CERTIFICATE OF CORRECTION

PATENT NO. : 6,108,436
DATED : August 22, 2000
INVENTOR(S) : Menno Jansen et al.

It is certified that error appears in the above-identified patent and that said Letters Patent is hereby corrected as shown below:

Column 1,
Line 8, "tho" should read -- the --.

Column 5,
Line 18 after "90°" delete -- C. --.
Line 22 after "90°" delete -- C. --.

Column 6,
Line 9, "stop" should read -- step --.

Column 7,
Line 18, "tho" should read -- the --.

Signed and Sealed this

Ninth Day of October, 2001

*Attest:*

NICHOLAS P. GODICI

*Attesting Officer*

*Acting Director of the United States Patent and Trademark Office*